UNITED STATES PATENT OFFICE.

EDWARD WILLIAM LUCAS, OF EALING, ENGLAND, ASSIGNOR TO HOWARD P. DENISON, OF SYRACUSE, NEW YORK.

METHOD OF TREATING WASTE SOAPY LIQUORS FROM LAUNDRIES.

1,245,605.

Specification of Letters Patent. Patented Nov. 6, 1917.

No Drawing. Application filed April 17, 1914. Serial No. 832,669.

*To all whom it may concern:*

Be it known that I, EDWARD WILLIAM LUCAS, a subject of the King of Great Britain, residing at Ealing, in the county of Middlesex, England, have invented a new and useful Method of Treating Waste Soapy Liquors from Laundries, of which the following is a specification.

This invention relates to the purification of the waste soapy liquors from laundries whereby the same are so purified as to be serviceable for further cleansing operations.

According to my invention the waste liquor on being discharged from the last washing machine and while still hot is treated with a permanganate (e. g. potassium permanganate) a peroxid (e. g. hydrogen peroxid) a perborate, a persulfate, a percarbonate, or other body capable of rapidly decolorizing and purifying the liquid, and then while still hot the liquor is filtered.

In carrying out my invention I may conveniently empty the waste liquor into a tank and while still hot add the requisite proportion of purifying agent, for example potassium permanganate, sufficient to decolorize the liquor. For ordinary brownish colored soapy waste liquors, about ¼ lb. of potassium permanganate per 100 gallons of liquor will be sufficient to effect the purification, but for fouler waste solutions more permanganate will be necessary, in some cases as much as ½ lb. or even a little more, per 100 gallons of liquor may be required. In the presence of alkali which is always contained by the waste liquors in question oxygen is liberated by this treatment and manganese-oxid thrown down. The liquor while still hot is then filtered by means of a filter press or other convenient means.

By this treatment it is possible, in a cheap and easy manner, to quickly remove a great proportion of colorizing matter dirt and offensive odor from waste laundry liquor and to render it fit for further cleansing operations. My invention effects a considerable saving of soap, washing soda and water, and also of coal for heating the water. The operation of purifying the waste liquor may be repeated one or more times before allowing it to run finally to waste.

When hydrogen peroxid is used the so called "10 volume" solution which liberates 3% of oxygen is selected. I find that from ¼ to 1% of this solution is sufficient, the exact quantity being dependent on the amount of purification required.

Sodium peroxid, sodium perborate and sodium persulfate all liberate oxygen in liquids of the nature of hot laundry waste and although the purifying action is not so rapid as in the case of the two reagents first given they are of real service. The proportions required vary from ⅛ to 1 per cent. Similarly percarbonates can be used in proportions varying from ⅛ to 2 per cent.

What I claim is:

1. A process for treating waste soapy liquors containing an alkali consisting in treating the waste liquor with an agent liberating oxygen in the presence of such alkali and then filtering the so-treated liquor to remove the impurities without separating the water from the soapy substance.

2. A process for treating waste soapy liquors containing an alkali consisting in treating the waste liquor with permanganate of potassium in amount varying from one thirty-second ($\frac{1}{32}$) of one per cent. to two (2%) per cent. of the treated liquor, and then filtering the so-treated liquor in order to remove the impurities without separating the water from the soapy substance.

EDWARD WILLIAM LUCAS.

Witnesses:
G. DONALD HARRISON,
HERBERT D. JAMESON.